Jan. 18, 1949.  C. P. NIELSEN  2,459,577
WELDING APPARATUS
Filed May 15, 1947
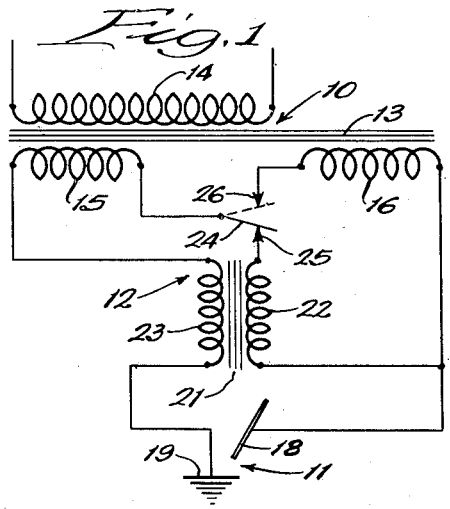
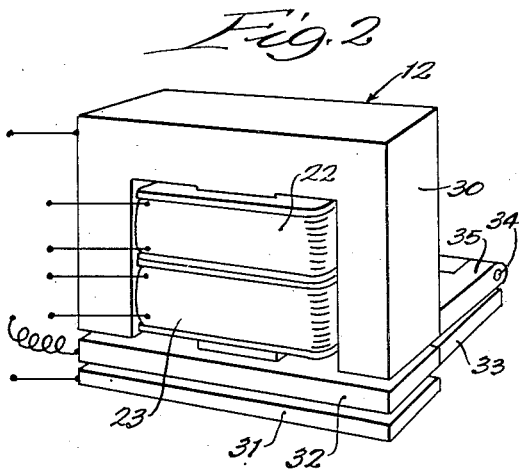
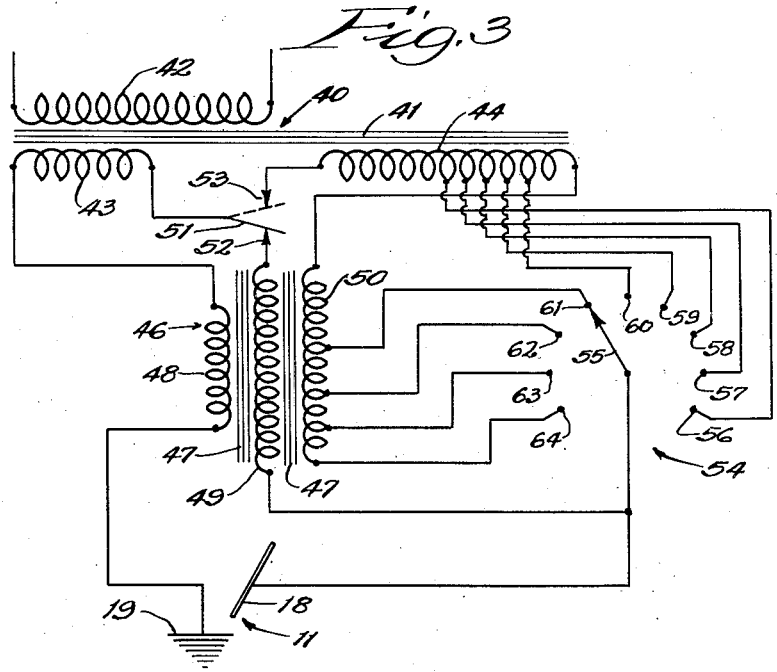
Inventor:
Clayton P. Nielsen,
By Dawson, Borth & Spangenberg
Attorneys Patented Jan. 18, 1949

2,459,577

UNITED STATES PATENT OFFICE 2,459,577

WELDING APPARATUS

Clayton P. Nielsen, Chicago, Ill., assignor to Mid-States Equipment Corporation, a corporation of Illinois Application May 15, 1947, Serial No. 748,236

4 Claims. (Cl. 315—277)

1

This invention relates to an electrical welding apparatus and a control system therefor.

In present day electrical welding systems, relatively powerful welding transformers are utilized for supplying electrical energy to the welding arc gap in order to obtain satisfactory welding. During the welding operation, large currents are utilized and the voltage across the welding arc gap is relatively small, in the neighborhood of 30 volts. When, however, the welding arc is extinguished, so that no current flows in the welding circuit, the voltage across the welding arc gap increases to a relatively high value, in the neighborhood of 100 volts. This relatively high open circuit voltage creates a definite hazard to the welding operator requiring him to be extremely careful in his actions or to shut down the welding apparatus. This necessarily slows down welding production.

The principal object of this invention is to provide an improved welding apparatus and control system therefor which eliminates the foregoing difficulties, which provides a large current to the welding arc gap during welding operations, which applies a relatively low voltage to the welding arc gap during standby periods when the welding arc is extinguished, and which automatically provides a large current for the welding arc gap upon closing of the same to establish the welding arc.

In carrying out this object of the invention, a relay is interposed between the welding arc gap and the welding transformer for automatically connecting a portion of the welding transformer secondary across the welding arc gap to apply a relatively low voltage thereto during the standby period when the welding arc is extinguished and for automatically connecting a greater portion of the welding transformer secondary across the welding arc gap when the latter is closed to provide a large current for establishing and maintaining the welding arc. In this way, the standby or open circuit voltage may be maintained relatively small, in the neighborhood of 30 volts, and yet permit automatic establishment of the welding arc upon closing of the arc gap. The hazardous standby conditions are thus eliminated and the welding apparatus becomes fully automatic in its operation thereby increasing welding production. The relay and the associated electrical connections may be incorporated directly in the welding apparatus or may be readily applied as an adaptor to existing welding systems.

Further objects of this invention reside in the details of construction of the welding apparatus and the cooperative relation between the component parts thereof.

Other objects and advantages of this invention will become apparent to those skilled in the art upon reference to the accompanying specification, claims, and drawing in which—

Figure 1 is a diagrammatic illustration of one form of the welding apparatus of this invention;

Figure 2 is a perspective view of a relay which may be utilized in the welding apparatus of Fig. 1; and Figure 3 is a diagrammatic illustration of another form of the welding apparatus of this invention.

Referring first to Fig. 1, the welding apparatus includes a welding transformer generally designated at 10, a welding arc gap generally designated at 11, and a control relay generally designated at 12.

The welding transformer 10 includes a core structure 13, a primary 14, and a pair of secondaries 15 and 16.

The welding arc gap 11 may take various forms but as diagrammatically shown in Fig. 1, it includes a welding electrode 18 and the work-piece 19 to be welded. The arc gap extends between the electrode 18 and the work-piece 19.

The relay 12 includes a core structure 21 upon which are placed energizing coils 22 and 23. The energizing coils control the operation of an armature 24 with respect to contacts 25 and 26. When the relay coils 22 and 23 are de-energized, the armature 24 engages the contact 25. When both of the relay coils 22 and 23 are energized, the armature 24 is moved from engagement with the contact 25 into engagement with the contact 26. When the relay coil 23 is energized and the relay coil 22 is de-energized, the armature 24 is maintained in engagement with the contact 26 provided it was previously in engagement therewith.

One end of the transformer secondary 15 is connected to the armature 24 and the other end thereof is connected through energizing coil 23 to the work-piece 19. The contact 25 is connected to one end of the energizing coil 22 and the other end is connected to the electrode 18. The contact 26 is connected to one end of the transformer secondary 16 and the other end thereof is connected to the electrode 18.

When the arc across the arc gap 11 is extinguished, the relay 12 is de-energized so that the armature 24 engages the contact 25 whereby the transformer secondary 15 and the relay coil 22 are connected in series with the electrode 18. Since under these conditions only the transformer secondary 15 is connected across the welding arc gap 11, the open circuit voltage or standby voltage is relatively small, in the neighborhood of 30 volts.

When, however, the arc gap 11 is closed by contacting the electrode 18 with the work-piece 19, a circuit is completed from one end of the transformer secondary 15 through armature 24, contact 25, relay coil 22, electrode 18, work-piece 19, and relay coil 23 back to the other end of the transformer secondary 15. Current is then caused to traverse this circuit to energize both relay coils 22 and 23 whereby the armature 24 is moved out of engagement with the contact 25 into engagement with the contact 26 to complete a welding circuit which may be traced from one end of the transformer secondary 15 through armature 24, contact 26, transformer secondary 16, electrode 18, work-piece 19, and relay coil 23 back to the other end of the transformer secondary 15. This circuit connects both transformer secondaries 15 and 16 across the arc gap 11 to supply a sufficient amount of current to the arc gap 11 to establish and maintain the welding arc thereacross.

It will be noted that this circuit includes the relay coil 23 for maintaining the armature 24 in engagement with the contact 26 even though the relay coil 22 is de-energized. During the welding operation, under these conditions, the current is relatively great and the welding voltage is relatively small, in the neighborhood of 30 volts.

When the welding arc is extinguished by separating the electrode 18 sufficiently far from the work-piece 19, the welding circuit is opened and the relay coil 23 is de-energized whereby the armature 24 moves into engagement with the contact 25. This interrupts the circuit through the transformer secondary 16 and connects the relay coil 22 in series with the transformer secondary 15 to produce the aforementioned relatively low open circuit or standby voltage. The welding apparatus is then in condition for repetition of the foregoing cycle of operation.

There is thus provided a welding apparatus with an automatic control system for supplying a relatively large current to the welding arc gap for welding purposes and for applying a relatively low voltage to the welding arc gap during the standby or open circuit period. The control system operates automatically in accordance with manipulation of the electrode 18 in the normal welding operations. The welding heat at the gap may be controlled in various ways as by changing the relative positions of the secondaries 15 or 16 or both with respect to the primary 14 or by changing the reactance or impedance of the welding circuit by changing the amount of iron, either within a coil or between the primary or secondary.

Fig. 2 illustrates a relay 12 which may be utilized in the welding circuit of Fig. 1. It includes an E-shaped core 30 upon which are mounted the relay coils 22 and 23. A plate 31 is spaced from the open face of the core 30 and an armature 32 is movably interposed therebetween. The armature 32 may be carried by an arm 33 pivotally connected by a pin 34 to a support 35 carried by the core 30. Of course, the armature 32 is electrically insulated from core 30. When the relay coils 22 and 23 are de-energized, the armature 32 engages the plate 31, and when they are energized, the armature 32 engages the core 30. The armature 32, therefore, corresponds to the armature 24 of Fig. 1, the plate 31 corresponds to the contact 25, and the core 30 corresponds to the contact 26. Suitable electrical connections are made to the core 30, the plate 31, and the armature 32. Also, suitable electrical connections are made to the relay coils 22 and 23. The armature 32 in contacting the core 30 and the plate 31 provides for large electrical contact surfaces which are extremely suitable for carrying the heavy current loads of the welding circuit.

The further form of the invention, illustrated in Fig. 3, is very similar to that shown in Fig. 1 with the exception that Fig. 3 illustrates another manner for adjustably varying the welding current. In Fig. 3, the welding transformer is generally designated at 40 and includes a core structure 41, a primary 42, a secondary 43, and a secondary 44. The secondary 44, however, is provided with a series of taps. The relay is generally designated at 46 and includes a core structure 47 and relay coils 48 and 49 corresponding to the relay coils 22 and 23 of Fig. 1 for operating an armature 51 with respect to contacts 52 and 53 which also correspond to the armature 24, contacts 25 and 26 of Fig. 1. In Fig. 3, however, the core structure 47 of the relay 46 also includes a coil 50 having a series of taps. The relay coil 50 performs a dual function, that of providing an impedance to the welding current and that of assisting the relay coil in maintaining the armature 51 in engagement with the contact 53.

The form of the invention shown in Fig. 3 also includes a multiple plug in arrangement or regulating switch generally designated at 54 for regulating the welding current. In this respect, it includes a movable contact or plug 55 adapted to engage contacts or sockets 56 to 64 inclusive which are respectively connected to the series of taps on the transformer secondary 44 and the relay coil 40.

When the contact 55 engages the contact 56, the maximum current flow for the welding operation is provided, and the operation of the form of the invention of Fig. 3 is the same as that described above in connection with Fig. 1. As the contact 55 is moved progressively to the contacts 57, 58, 59 and 60, more turns of the transformer secondary 44 become effective whereby the current flow for the welding operation is progressively decreased. When the contact 55 engages the contact 61, the upper portion of the relay coil 50 is connected in series in the welding circuit and it operates as an impedance to further decrease the welding current. The relay coil 50, however, is associated with the core structure 57 to compensate for the decrease in current flow through the relay coil 48 for the purpose of maintaining the armature 51 in engagement with the contact 53. As the contact 55 is progressively moved to contacts 62, 63, and 64, the impedance afforded by the relay coil 50 is correspondingly increased to decrease further the welding current. However, more and more sections of the relay coil 50 become effective in assisting the relay coil 48 in holding the armature 51 in engagement with the contact 53 whereby de-energization of the relay 46 is prevented even though the welding current is reduced to a relatively low value.

Thus the arrangement of Fig. 3 corresponds in operation to that of Fig. 1 for accomplishing the same results, but utilizes a different arrangement for regulating the welding current.

While relay coils 22 and 49 of Figs. 1 and 3 are preferably utilized for assisting relay coils 23 and 48 in energizing the relays 12 and 46 upon closing of the arc gap, they may be dispensed with providing the relay coils 23 and 48 have sufficient turns to energize the relays. However, the illustrated arrangement is preferable since the relay coils 23 and 48 may have fewer turns and thus provide less impedance to current flow in the welding circuit during welding operations.

While for purposes of illustration, two forms of this invention have been disclosed, other forms thereof may become apparent to those skilled in the art upon reference to this disclosure and, therefore, this invention is to be limited only by the scope of the appended claims and prior art.

I claim for my invention:

1. A control system for a welding apparatus having transformer means with first and second secondaries for supplying voltage and current to the welding arc gap, comprising a relay having switch means and a pair of energizing coils, electrical connections for connecting the first transformer secondary, the switch means and the pair of energizing coils in series across the welding arc gap to apply a relatively low voltage to the welding arc gap when the welding arc is extinguished, to maintain the relay deenergized when the welding arc is extinguished and to energize the relay when the welding arc gap is closed for establishing the welding arc, and electrical connections for connecting both the first and second transformer secondaries, the switch means and one of the energizing coils in series across the welding arc gap to supply a relatively large current to the welding arc gap when the welding arc is established and to maintain the relay energized when the welding arc is established.

2. A control system, for a welding apparatus having transformer means with first and second secondaries for supplying voltage and current to the welding arc gap, comprising a relay having switch means and a pair of energizing coils, electrical connections for connecting the first transformer secondary, the switch means and the pair of energizing coils in series across the welding arc gap to apply a relatively low voltage to the welding arc gap when the welding arc is extinguished, to maintain the relay deenergized when the welding arc is extinguished and to energize the relay when the welding arc gap is closed for establishing the welding arc, electrical connections for connecting both the first and second transformer secondaries, the switch means and one of the energizing coils in series across the welding arc gap to supply a relatively large current to the welding arc gap when the welding arc is established and to maintain the relay energized when the welding arc is established, taps in the second transformer secondary, and a switch included in said last mentioned electrical connections for selectively connecting the taps for adjusting the value of the relatively large current supplied to the welding arc gap.

3. A control system, for welding apparatus having transformer means with first and second secondaries for supplying voltage and current to the welding arc gap, comprising a relay having switch means and a pair of energizing coils, electrical connections for connecting the first transformer secondary, the switch means and the pair of energizing coils in series across the welding arc gap to apply a relatively low voltage to the welding arc gap when the welding arc is extinguished, to maintain the relay de-energized when the welding arc is extinguished and to energize the relay when the welding arc gap is closed for establishing the welding arc, electrical connections for connecting both the first and second transformer secondaries, the switch means and one of the energizing coils in series across the welding arc gap to supply a relatively large current to the welding arc gap when the welding arc is established and to maintain the relay energized when the welding arc is established, an impedance coil having taps and electromagnetically coupled to the relay, and a switch included in said last mentioned electrical connections for selectively connecting the taps for adjusting the value of the relatively large current flow supplied to the welding arc gap and for maintaining the relay energized.

4. A control system, for a welding apparatus having transformer means with first and second secondaries for supplying voltage and current to the welding arc gap, comprising a relay having switch means and a pair of energizing coils, electrical connections for connecting the first transformer secondary, the switch means and the pair of energizing coils in series across the welding arc gap to apply a relatively low voltage to the welding arc gap when the welding arc is extinguished, to maintain the relay de-energized when the welding arc gap is closed for establishing the welding arc, electrical connections for connecting both the first and second transformer secondaries, the switch means and one of the energizing coils in series across the welding arc gap to supply a relatively large current to the welding arc gap when the welding arc is established and to maintain the relay energized when the welding arc is established, taps in the second transformer secondary, an impedance coil having taps and electromagnetically coupled to the relay, and a switch included in said last mentioned electrical connections for selectively connecting the taps of the transformer secondary and the impedance coil for adjusting the value of the relatively large current flow supplied to the welding arc gap and for maintaining the relay energized.

CLAYTON P. NIELSEN.

REFERENCES CITED

The following references are of record in the file of this patent:

UNITED STATES PATENTS

| Number | Name | Date |
| --- | --- | --- |
| 1,354,398 | Holslag | Sept. 28, 1920 |
| 1,640,877 | Brueckner | Aug. 30, 1937 |
| 1,993,633 | Tjoflat | Mar. 5, 1935 |
| 2,380,541 | Morton | July 31, 1945 |